United States Patent Office 3,433,780
Patented Mar. 18, 1969

---

3,433,780
COLLOIDAL SILSESQUIOXANES AND METHODS FOR MAKING SAME
Joseph Cekada, Jr. and Donald R. Weyenberg, Midland, Mich., assignors to Dow Corning Corporation, Midland, Mich., a corporation of Michigan
No Drawing. Continuation-in-part of application Ser. No. 427,077, Jan. 21, 1965. This application Jan. 25, 1967, Ser. No. 611,579
U.S. Cl. 260—29.2          48 Claims
Int. Cl. C08g 31/12, 31/26

ABSTRACT OF THE DISCLOSURE

Colloidal suspensions of silsesquioxanes of the unit formula $RSiO_{3/2}$, wherein R is a hydrocarbon or a substituted hydrocarbon radical containing from 1 to 7 carbon atoms, in a water-surfactant mixture, said silsesquioxanes having an average particle size in the range of 10 to 1000 A. These suspensions are prepared by adding the appropriate silane to a water-surfactant mixture, with agitation, the amount of silane being (1) less than 10% or (2) the silane being added at the rate of less than ten mols of silane per liter per hour.

---

This application is a continuation-in-part of our abandoned U.S. patent application Ser. No. 427,077, filed Jan. 21, 1965, which is a continuation-in-part of abandoned U.S. patent appliction Ser. No. 330,240, filed Dec. 13, 1963, by Donald E. Findlay and Donald R. Weyenberg and entitled "Method of Polymerizing Siloxanes and Silcarbanes in Emulsion." The latter application was refiled on Sept. 13, 1965, as U.S. patent application Ser. No. 487,036 and is now U.S. Patent 3,294,725.

This invention relates to colloidal suspensions of silsesquioxanes and to methods for making such suspensions. More specifically, this invention relates to colloidal suspensions of silsesquioxanes having the unit formula $RSiO_{3/2}$ in a water-surfactant mixture, said silsesquioxanes having an average particle size in the range of 10 to 1000 A.

The colloidal suspensions of this invention are unique in that the average particle size of the silsesquioxanes is extremity small and it is this characteristic that imparts the unusual and beneficial properties to these materials. So far as is known at the present time, the colloidal suspensions of this invention can only be prepared by the two methods disclosed and claimed herein. These colloidal suspensions are useful, for example, for treating fabrics to render them resistant to soiling and as fillers in latexes. Colloidal suspensions wherein the average particle size of the silsesquioxanes is in the range of 10 to 500 A. are particularly preferred for the above mentioned uses.

The colloidal suspensions of this invention are prepared by adding a silane having the formula $RSi(OR'')_3$ to a water-surfactant mixture, with agitation, under acidic or basic conditions. However, to obtain silsesquioxanes having an average particle size in the 10 to 1000 A. range the amount of silane added must be less than about 10 per cent based on the combined weights of the silane, water and surfactant when the addition is rapid. The exact amount of silane that can be added depends on the substituent R and whether an anionic or cationic surfactant is used. When it is desirable to employ a greater amount of silane, it is then essential that the silane be added at a rate of less than ten mols of silane per liter per hour. At this slow rate of addition it is possible in some instances to increase the amount of silane up to 50% based on the combined weights of the silane, water and surfactant and again the exact amount that can be added will depend on substituent R and whether an anionic or cationic surfactant is used. However, in all cases the total amount of silane employed should not exceed that amount which would give an ultimate solids content greater than that which the particular system involved can tolerate. The processes of this invention can be used for producing the colloidal suspensions of the silsesquioxanes either batchwise or continuously.

In the above formulae, the substituent R can be any monovalent radical selected from the group consisting of hydrocarbon and substituted hydrocarbon radicals containing 1 to 7 carbon atoms. Thus R can be, for example, an alkyl, alkenyl, alkynyl, cycloalkyl, aryl, alkaryl, or aralkyl radicals, or the corresponding radicals containing substituents such as halogen atoms or mercapto, hydroxyl, cyano, amino, epoxy or acrylato groups. Of course when any substituent is present that reacts with water under the existing conditions, it will not be present as such in the final product.

Specific examples of R include the ethyl, propyl, isopropyl, butyl, amyl, heptyl, vinyl, butenyl, cyclobutyl, cyclohexyl, phenyl, tolyl, benzyl, chloromethyl, 3-bromopropyl, 3,3,3-trifluoropropyl, 5,5,5,4,4,3,3-heptafluoropentyl, dichlorophenyl, α,α,α-trifluorotolyl, mercaptoethyl, mercaptopropyl, cyanoethyl, cyanopropyl, aminopropyl, methyl, $H_2NCH_2CH_2NH(CH_2)_3$—, $H_2NCH_2CH_2NHCH_2CH(CH_3)CH_2$—, aminophenyl, $CH_2$=$CHCOO(CH_2)_3$—, $CH_2$=$C(CH_3)COO(CH_2)_3$—,

hydroxypropyl or a $HOCH_2CH(OH)CH_2SCH_2CH_2$— radical.

Of the foregoing radicals, the methyl, 3,3,3-trifluoropropyl, mercaptopropyl and phenyl radicals are preferred.

In the hydrolyzable portion of the silanes used to prepare the colloidal suspensions, the R'' group can be a hydrogen atom or any alkyl group containing 1 to 4 carbon atoms, such as a methyl, ethyl, propyl, isopropyl or a butyl group, or R'' can be a

—$CH_2CH_2OH$, —$CH_2CH_2OCH_3$ or a —$CH_2CH_2OC_2H_5$ group. It is preferred that R″ be a methyl or an ethyl group. That is to say, it is preferred to use methoxy or ethoxy silanes in the processes of this invention.

Of course the formula $RSiO_{3/2}$ covers copolymers, both block and random, of the silsesquioxanes. Such copolymers can be produced by the sequential addition of the appropriate silanes or the addition of a mixture of the appropriate silanes to the water-surfactant mixture. It will be obvious that when the R groups are substituted hydrocarbon radicals that mutually reactive substituents should not be used for making copolymers.

The surfactant employed in preparing the colloidal suspensions of this invention is one selected from the group consisting of aliphatically substituted benzene-sulfonic acids containing at least six carbon atoms in the aliphatic substituents, aliphatically substituted naphthalene-sulfonic acids containing at least four carbon atoms in the aliphatic substituents, aliphatic sulfonic acids containing at least six carbon atoms in the aliphatic substituent, silylalkylsulfonic acids containing at least six carbon atoms in the alkyl substituent, aliphatically substituted diphenylethersulfonic acids containing at least six carbon atoms in the aliphatic substituents, alkylhydrogen sulfates containing at least six carbon atoms in the alkyl substituents, quaternary ammonium halides, and quaternary ammonium hydroxides.

The above surfactants serve a dual function in the instant invention. One function is to maintain the colloidal suspension of the silsesquioxane, and the other function is to catalyze the polymerization of the silsesquioxane.

When the surfactant is one of the above anionics, it is preferable that the aliphatic substituents contain at least 8 carbon atoms and most preferably 12 carbon atoms. Specific examples of the aliphatic substituents are the hexyl, octyl, decyl, dodecyl, cetyl, stearyl, myricyl, oleyl, nonenyl, octynyl, phytyl and pentadecadienyl radicals. Of the anionic surfactants, the aliphatically substituted benzenesulfonic acids are preferred.

When the surfactant is one of the above cationics, it is preferable that it be one of the halides and most preferable a chloride or bromide.

The specific amount of surfactant employed is not critical so long as enough is used to maintain the silsesquioxane in colloidal suspension. It should be noted that the particle size of the silsesquioxane can be controlled by the surfactant concentration and this should be considered.

Other surfactants, including nonionics and amphoterics, can be employed in conjunction with the above surfactants so long as they are not of such a nature or are not used in such quantities so as to have an adverse effect on the stability of the colloidal suspensions.

The above surfactants are well known in the art and hence no need exists for describing them again in detail here. Specific examples of the preferred surfactants are found in the examples.

The process of this invention can be carried out at any desired temperature, for example, for 0° to 100° C. or higher. Preferably, of course, the process should be carried out at a temperature below the boiling point of water although, if desired, temperatures above 100° C. can be employed if the process is carried out in a closed system. The preferred temperature range is from 15° to 90° C. with a temperature around that of room temperature being the most preferred.

The silsesquioxanes can be recovered from the colloidal suspensions in any manner if recovery of the silsesquioxane per se is desired. For example, the silsesquioxanes can be separated from the suspension by the addition of salts such as sodium chloride, by the addition of water soluble alcohols such as methanol, ethanol or isopropanol, or by the evaporation of the water. These and other means of recovering materials from colloidal suspensions are well known to those skilled in the art. Of course, it is not necessary to separate the silsesquioxane from the suspension prior to its use and in some instances it is even preferable or essential not to do so.

The concentration of the silsesquioxane in suspension can be increased after preparation within limits depending on the particular R group. Thus, by way of example, when R is methyl, about 15% silsesquioxane solids can be tolerated, when R is phenyl, about 25% solids can be tolerated, and when R is propyl, about 23% solids can be tolerated. These percents are based on the silsesquioxane.

If the colloidal suspension of the silsesquioxane is acidic or basic after its preparation, the colloidal suspension can be neutralized with a suitable material such as hydrohydroxide, sodium hydroxide or sodium bicarbonate. This neutralization is not necessary unless for some particular use or other reason a neutral suspension is desired. The ammonium hydroxide is preferred for neutralizing acidic suspensions since they are somewhat sensitive to sodium ions and can even be broken by them if the neutralization is not carefully done. When sodium ions are to be used for neutralization, an ion exchange resin such as a sodium sulfate resin is preferred.

In order that those skilled in the art may better understand how the present invention can be practiced, the following examples are given by way of illustration and not by way of limitation.

All parts and percents referred to herein are on a weight basis unless otherwise specified.

EXAMPLE 1

Colloidal suspensions of $C_3H_7SiO_{3/2}$, $CH_2=CHSiO_{3/2}$ and $C_6H_5SiO_{3/2}$, wherein the average particle size of the silsesquioxane was in the range of 10 to 1000 A., were prepared as follows. To a four ounce bottle was added distilled water and dodecylbenzene sulfonic acid surfactant. Propyltrimethoxysilane, vinyltrimethoxysilane or phenyltrimethoxysilane was then added to the bottle and the mixture vigorously shaken. The amounts of water, surfactant and silanes employed to form the stable colloidal suspensions are set forth in the table below.

| Water | (gms.) | Surfactant (gms.) | Silane (gms.) |
|---|---|---|---|
| (A) | 94.75 | 0.25 | Propyl (5). |
| (B) | 94.75 | 0.25 | Vinyl (5). |
| (C) | 94.75 | 0.25 | Phenyl (5). |

EXAMPLE 2

Colloidal suspensions of $CH_3SiO_{3/2}$, $C_2H_5SiO_{3/2}$, $C_3H_7SiO_{3/2}$, $C_4H_9SiO_{3/2}$, $C_5H_{11}SiO_{3/2}$ $CH_2=CHSiO_{3/2}$, $C_6H_5SiO_{3/2}$ and $CF_3CH_2CH_2SiO_{3/2}$, wherein the average particle size of the silsesquioxane was in the range of 10 to 1000 A., were prepared as follows. To a 500 ml. three-necked flask fitted with a stirrer, a condenser, a thermometer, a pressure-equalizing addition funnel, and a Variac-controlled heating mantel were added water and dodecylbenzene sulfonic acid. Some of the suspensions were prepared at room temperature (RT) while others were prepared at various temperatures by heating the water-surfactant mixture to the desired temperature and then maintaining this temperature ($\pm 3°$ C.) during the dropwise addition of the silane from the funnel. The stirrer was started prior to addition of the silane. Some of the suspensions were made under reduced pressure so that some or all of the alcohol produced by the hydrolysis of the silanes was removed from the mixture. All of the silsesquioxanes were prepared from the corresponding methoxysilanes except the 3,3,3-trifluoropropylsilsesquioxane which was prepared from the corresponding ethoxysilane. The rate of addition of the silanes in all cases was less than ten mols of silane per liter per hour. The amounts of water, surfactants and silanes, and the time it took to add the silanes are specified in the following table. The temperatures and pressures employed in making the stable colloidal suspensions are also set forth in the table.

or mixture thereof, was added dropwise to the flask, with agitation. The amounts of water, surfactant and silanes,

TABLE

| | Water (gms.) | Surfactant (gms.) | Silane (gms.) | Addition time (hrs.) | Temp.,° C. | Pressure (mm. Hg) |
|---|---|---|---|---|---|---|
| (A) | 89.5 | 0.5 | Methyl (10) | 1.5 | 50 | (2) |
| (B) | 89.5 | 0.5 | ___do___ | 1.0 | 50 | (2) |
| (C) | 89.5 | 0.5 | ___do___ | 1.0 | 50 | (2) |
| (D) | 79.46 | 1 0.54 | Ethyl (20) | 4.5 | RT | (2) |
| (E) | 68.5 | 1.5 | Propyl (30) | 2.3 | 50 | (2) |
| (F) | 68.5 | 1.5 | ___do___ | 2.0 | 70 | (2) |
| (G) | 68.5 | 1.5 | ___do___ | 1.5 | 90 | (2) |
| (H) | 68.5 | 1.5 | ___do___ | 0.5 | 50 | (2) |
| (I) | 58.5 | 1.5 | ___do___ | 1.5 | RT | (2) |
| (J) | 89.5 | 0.5 | Propyl (10) | 1.0 | RT | (2) |
| (K) | 89.5 | 0.5 | Butyl (10) | 1.0 | RT | (2) |
| (L) | 89.5 | 0.5 | Vinyl (10) | 1.75 | 50 | (2) |
| (M) | 89.5 | 0.5 | Phenyl (10) | 1.17 | 50 | (2) |
| (N) | 89.5 | 0.5 | $CF_3CH_2CH_2-(10)$ | 0.5 | 50 | (2) |
| (O) | 89.5 | 0.5 | ___do___ | 1.5 | 50 | (2) |
| (P) | 68.5 | 1.5 | Propyl (30) | 2.0 | 50 | 135 |
| (Q) | 89.5 | 0.5 | Propyl (10) | 1.0 | 50 | 150 |
| (R) | 68.5 | 1.5 | Propyl (30) | 2.5 | 50 | 150 |
| (S) | 89.5 | 0.5 | Amyl (10) | 2.0 | 50 | 135 |
| (T) | 68.5 | 1.5 | Amyl (30) | 1.75 | 50 | 135 |
| (U) | 79.0 | 1.0 | Phenyl (20) | 1.17 | 50 | 135 |

1 Instead of dodecylbenzene sulfonic acid, a mixture of 70% by wt. of dioctadecyldimethyl ammonium chloride and 30% by wt. of dihexadecyldimethyl ammonium chloride was used.
2 Atmospheric.

EXAMPLE 3

A mixture of 1106 g. of distilled water and 14 g. of dodecylbenzene sulfonic acid was placed in a flask and heated to 60° C. Then 280 g. of $CH_3Si(OCH_3)_3$ was added dropwise to the flask, with agitation, at the rate of about 60 g. per hour. After addition of the silane was complete, agitation was continued overnight with the temperature being maintained at 60° C. The next day the resulting colloidal suspension was filtered, allowed to cool to 30° C. and neutralized with ammonium hydroxide. The product was a colloidal suspension of $CH_3Si_{3/2}$ wherein the particle size of the silsesquioxane was about 100 A.

EXAMPLE 4

The colloidal suspension of Example 3 was placed in an aerosol container. A piece of ash beige wool carpeting was obtained and part of it sprayed with the colloidal suspension of the silsesquioxane so that 0.4 gram of silsesquioxane solids per square foot of carpeting was applied. Another part of the carpet was left untreated for purposes of comparison. After the treatment the carpet was allowed to dry and then placed in a clockroom of an industrial plant to test the dry-soiling resistance of the treatment. After 3 days of traffic the carpet was taken up and vacuumed. The portion of the carpet that had been treated with the colloidal suspension of the silsesquioxane of this invention was found to be much cleaner than the control portion.

The above process was repeated except that a piece of white Acrilan (acrylic) carpet was used instead of the wool carpet, 0.5 gram silsesquioxane solids per square foot of carpeting was applied and the carpet was left in the clockroom for 5 days. The treated portion of the carpet was the cleanest showing only very light soiling after vacuuming whereas the control portion was dark grey in color.

EXAMPLE 5

Colloidal suspension of $CH_3SiO_{3/2}$, $C_6H_5SiO_{3/2}$ and a copolymer of the two silsesquioxanes, wherein the average particle size of the silsesquioxane was in the range of 10 to 1000 A., were prepared as follows. To a flask equipped with a stirrer, a condenser, a thermometer and an addition funnel were added water and a 50% solution of tallowtrimethylammonium chloride in water and isopropanol. The aqueous sodium hydroxide was added to adjust the pH to about 11. The flask contents were heated to 70–75° C. and then the appropriate trimethoxysilane, or mixture thereof, was added dropwise to the flask, with agitation. The amounts of water, surfactant and silanes, and the approximate time required to add the silanes are specified in the table below.

| | Water (gms.) | Surfactant (gms.) | Silane (gms.) | Addition time (hrs.) |
|---|---|---|---|---|
| (A) | 1,170 | 30 | Methyl (300) | 5 |
| (B) | 1,961 | 89 | Methyl (271) | 4 |
| (C) | 1,961 | 89 | Phenyl (400) | 18 |
| (D) | 1,961 | 54 | ___do___ | 18 |
| (E) | 1,961 | 28 | ___do___ | 18 |
| (F) | 1,961 | 89 | Methyl (68) Phenyl (300) | 3.5 |

EXAMPLE 6

The procedure of Example 5(C) was repeated except that the pH was adjusted with sodium bicarbonate to a value of 8. Equivalent results were obtained.

EXAMPLE 7

Colloidal suspensions of $C_3H_7SiO_{3/2}$ were prepared by adding 120 g. of propyltrimethoxysilane, with agitation, to a mixture of water and surfactant that had been heated to 60° C. The silane was added dropwise over a period of about 2 hours. The amount of water employed in each case was sufficient to bring the total weight of the silane, water and surfactant to 600 g. The surfactants and the amounts employed are set forth below.

(A) 6 g. dodecylbenzene sulfonic acid
(B) 1.5 g. dodecylbenzene sulfonic acid,
    4.5 g. sodium dodecylbenzene sulfonate
(C) 3 g. dodecylbenzene sulfonic acid,
    3 g. sodium dodecylbenzene sulfonate
(D) 4.5 g. dodecylbenzene sulfonic acid,
    1.5 g. sodium dodecylbenzene sulfonate
(E) 6 g. dodecylbenzene sulfonic acid,
    7.2 g. 10% aqueous ammonium hydroxide It was found that any of the colloidal suspensions of this example can be neutralized with ammonium hydroxide or sodium carbonate if so desired.

EXAMPLE 8

A silicone rubber latex was prepared which contained 100 parts of an essentially linear hydroxyl endblocked polydimethylsiloxane polymer in the form of a 35% solids emulsion having a viscosity of about $1 \times 10^6$ cps., 40 parts of $CH_3SiO_{3/2}$ having a particle size of about 160 A. in the form of a 5% solids colloidal suspension prepared in accordance with this invention, 1 part of $CH_3Si(OCH_3)_3$ and 1 part of dibutyltin dilurate. The latex was spread on a surface and the water evaporated at room temperature and atmospheric pressure leaving a silicone rubber film behind. The tensile strength (T) in pounds per square inch, the percent elongation (E) and the percent tension set (TS) of this rubber was measured by pulling a 1 inch by ⅛ inch test bar on an Instron tester at a rate of 2 inches per minute. The durometer (D) of this rubber was measured according to ASTM test D 676–59T. The properties of this rubber were T=632 p.s.i., E=694%, TS=24% and D=62.

EXAMPLE 9

Six colloidal suspensions were made of $CH_3SiO_{3/2}$ wherein the average particle size was in the range of 10 to 1000 A. Varying amounts of methyltrimethoxysilane, dodecylbenzene sulfonic acid and water were used in the preparation as specified in the table below. This example shows that widely varying amounts of surfactant, based on the silane, can be employed in the water-surfactant mixture. All the amounts specified below are in grams.

|     | Silane | Surfactant | Water | Particle Size A. |
|-----|--------|------------|-------|------------------|
| (A) | 5      | 0.01       | 94.99 | 746              |
| (B) | 5      | 0.05       | 94.95 | 406              |
| (C) | 5      | 0.1        | 94.9  | 126              |
| (D) | 15     | 0.5        | 84.5  | <50              |
| (E) | 1      | 0.5        | 98.5  | 470              |
| (F) | 0.5    | 0.5        | 99    | <50              |

EXAMPLE 10

Two colloidal suspensions were made of $CH_3SiO_{3/2}$ wherein the average particle size was in the range of 10 to 1000 A. One solution was made employing 10 g. of methyltrimethoxysilane, 0.25 g. of dodecylbenzenesulfonic acid, 0.25 g. of the adduct of 2,4,8-trimethyl-6-nonanol with six mols of ethylene oxide and 89.5 g. of water while the other solution was made employing 10 g. of methyltrimethoxysilane, 0.1 g. of dodecylbenzene sulfonic acid, 0.4 g. of the adduct of 2,4,8-trimethyl-6-nonanol with six mols of ethylene oxide and 89.5 g. of water. This example shows that mixtures of surfactants can be employed in making the silsesquioxanes.

EXAMPLE 11

Three colloidal suspensions were made using the following procedure. A mixture of 13.2 g. of a 3.55% aqueous solution of $C_{12}H_{25}OSO_3H$ and water was placed in a 500 ml. flask equipped with a stirrer, condenser and addition funnel. The silane to be polymerized was placed in addition funnel and slowly added to the stirred mixture in the flask over a period of about 1¼ hours at room temperature. The mixture was stirred overnight at room temperature and then neutralized with 0.1 N sodium hydroxide. The resulting products were colloidal suspensions containing about 5% solids of the silsesquioxanes. The specific silanes, the amounts of silane and water, the appearance of the suspension, and the average particle size of the silsesquioxane are set forth in the table below.

| Silane (gms.) | $H_2O$ (gms.) | Appearance | Particle Size, A. |
|---|---|---|---|
| $CH_3Si(OCH_3)_3$ (20.3) | 166.5 | Clear | 130 |
| $CF_3CH_2CH_2Si(OCH_3)_3$ (14.6) | 172.2 | Cloudy-white | 500–1,000 |
| $C_6H_5Si(OCH_3)_3$ (15.3) | 171.5 | do | 500–1,000 |

EXAMPLE 12

In a flask, 89 g. of distilled water and 1 g. of a commercial nonylnaphthalene sulfonic acid were mixed. Then 10 g. of $CH_3Si(OCH_3)_3$ was added rapidly and resulting mixture shaken vigorously. A clear solution was formed which gradually changed in appearance to a hazy-blue color. The resulting product was a colloidal suspension of $CH_3SiO_{3/2}$ having a particle size in the range of 440 to 590 A.

EXAMPLE 13

In this example lauryltrimethylammonium chloride was dispersed in water and the 1.0 molar ammonium hydroxide added with agitation at room temperature. The surfactant is used as a 50% solids solution in a 50—50 mixture of isopropanol and water. Next the silane, or mixture of silanes, to be polymerized was added from an addition funnel, through a reflux condenser, over a period of two hours. Colloidal suspensions of the silsesquioxanes having average particle sizes in the range of 10 to 1000 A. were obtained. The specific silanes and the amounts of all the reactants are set forth in the table below. The suspensions marked with an asterick (*) were neutralized to a pH of 7 with 20% HCl after preparation.

|        | Water (gms.) | Surfactant (gms.) | $NH_4OH$ (gms.) | Silane(s) | Gms. |
|--------|--------------|-------------------|-----------------|-----------|------|
| (A)    | 217          | 5.2               | 3               | $C_3H_7Si(OCH_3)_3$ | 51.8 |
| (B)    | 878          | 18.4              | 12              | $HS(CH_2)_3Si(OCH_3)_3$ | 184 |
| (C)    | 827          | 10                | 10              | $C_6H_5Si(OCH_3)_3$ | 153 |
| (D)    | 1,354        | 15                | 15              | $Cl(CH_2)_3Si(OCH_3)_3$ | 116 |
| (E)    | 1,177        | 30                | 15              | $\{CH_3Si(OCH_3)_3$ / $H_2NCH_2CH_2NH(CH_2)_3Si(OCH_3)_3$ | 213 / 65.2 |
| (F)    | 1,162        | 30                | 15              | $\{CH_3Si(OCH_3)_3$ / $H_2NCH_2CH_2NH(CH_2)_3Si(OCH_3)_3$ | 260.3 / 32.6 |
| (G)*   | 1,162        | 30                | 15              | $\{CH_3Si(OCH_3)_3$ / $H_2NCH_2CH_2NH(CH_2)_3Si(OCH_3)_3$ | 260.3 / 32.6 |
| (H)*   | 1,160        | 30                | 15              | $\{CH_3Si(OCH_3)_3$ / $HS(CH_2)_3Si(OCH_3)_3$ | 260 / 34.7 |
| (I)*   | 1,172        | 30                | 15              | $\{CH_3Si(OCH_3)_3$ / $HS(CH_2)_3Si(OCH_3)_3$ | 213 / 69.5 |
| (J)    | 1,173.4      | 30                | 30              | $\{CH_3Si(OCH_3)_3$ / $HS(CH_2)_3Si(OCH_3)_3$ | 285 / 11.6 |
| (K)*   | 1,163        | 30                | 15              | $\{CH_3Si(OCH_3)_3$ / $CF_3CH_2CH_2Si(OCH_3)_3$ | 259 / 32.9 |
| (L)    | 1,173        | 30                | 15              | $\{CH_3Si(OCH_3)_3$ / $Cl(CH_2)_3Si(OCH_3)_3$ | 213 / 69 |
| (M)*   | 1,160        | 30                | 15              | $\{CH_3Si(OCH_3)_3$ / $Cl(CH_2)_3Si(OCH_3)_3$ | 260.3 / 34.5 |

EXAMPLE 14

In this example lauryltrimethylammonium chloride was dispersed in water and agitated at room temperature. The surfactant is used as a 50% solids solution in a 50—50 mixture of isopropanol and water. The silane, or mixture of silanes, to be polymerized was added from an addition funnel, through a reflux condenser, over a period of two hours. Colloidal suspensions of the silsesqunioxanes having average particle sizes in the range of 10 to 1000 A. were obtained. The specific silanes and the amounts of all the reactants are set forth in the table below.

|  | Water (gms.) | Surfactant (gms.) | Silane(s) | Gms. |
|---|---|---|---|---|
| (A) | 2,538 | 42 | $H_2NCH_2CH_2NH(CH_2)_3Si(OCH_3)_3$ | 420 |
| (B) | 1,174 | 30 | $CH_3Si(OCH_3)_3$ | 285 |
|  |  |  | $H_2NCH_2CH_2NH(CH_2)_3Si(OCH_3)_3$ | 10.5 |

EXAMPLE 15

The colloidal suspensions of this example were prepared by the slow addition of the silanes to an agitating mixture of the water, surfactant and ammonium hydroxide (1 molar—if used) at ambient conditions. The rate of silane addition was less than 5% solids per hour. The particular reactants, their quantities, and the average particle sizes of the resulting silesequioxanes are set forth in the table below.

EXAMPLE 16

When the silanes or mixtuers thereof set forth below are substituted for those in the preceding examples in equivalent amounts, silsesquioxane or silsesquioxane copolymers composed of the units indicated below are obtained. The products will have average particle sizes in the range of 10 to 1000 A.

|  | Silane | Silsesquioxane |
|---|---|---|
| (A) | $ClCH_2Si(OCH_2CH_2OC_2H_5)_3$ | $ClCH_2SiO_{3/2}$ |
| (B) | $Cl(CH_2)_3Si(OCH_3)_3$ | $Cl(CH_2)_3SiO_{3/2}$ |
| (C) | $CH_3Si(OC(O)CH_3)_3$ | $CH_3SiO_{3/2}$ |
| (D) | $Br(CH_2)_4Si(OC_2H_5)_3$ | $Br(CH_2)_4SiO_{3/2}$ |
| (E) | $C_6H_5Si(OH)_3$ | $C_6H_5SiO_{3/2}$ |
| (F) | $CH_3Si(OCH_2CH_2OH)_3$ | $CH_3SiO_{3/2}$ |
|  | $C_2H_5Si(OCH_3)_3$ | $C_2H_5SiO_{3/2}$ |
| (G) | $CH_3Si(OC_3H_7)_3$ | $CH_3SiO_{3/2}$ |
|  | $CF_3CH_2CH_2Si(OC_2H_5)_3$ | $CF_3CH_2CH_2SiO_{3/2}$ |

|  | Water (gms.) | Surfactant (gms.) | NH₄OH (gms.) | Silane(s) | Gms. | Particle Size, A. |
|---|---|---|---|---|---|---|
| (A) | 179 | ¹1 |  | $CH_3Si(OCH_3)_3$ | 20 | 120 |
| (B) | 92.8 | ¹0.36 |  | $CH_2\text{—}CHCH_2O(CH_2)_3Si(OCH_3)_3$ (epoxide) | 7.2 | 10–1,000 |
| (C) | 895 | ²5 |  | $C_4H_9Si(OCH_3)_3$ / $CH_3Si(OCH_3)_3$ | 4.1 / 94.6 | 120 |
| (D) | 895 | ²4.78 |  | $C_4H_9Si(OCH_3)_3$ / $CH_3Si(OCH_3)_3$ | 24.7 / 71 | 170 |
| (E) | 895 | ²5 |  | $CH_2\text{—}CHCH_2O(CH_2)_3Si(OCH_3)_3$ / $CH_3Si(OCH_3)_3$ | 3.76 / 96.4 | 170 |
| (F) | 895 | ²5 |  | $CH_2\text{—}CHCH_2O(CH_2)_3Si(OCH_3)_3$ / $CH_3Si(OCH_3)_3$ | 23.6 / 71 | 10–1,000 |
| (G) | 895 | ²5 |  | $HS(CH_2)_3Si(OCH_3)_3$ / $CH_3Si(OCH_3)_3$ | 3.86 / 96.4 | 120 |
| (H) | 895 | ²4.7 |  | $HS(CH_2)_3Si(OCH_3)_3$ / $CH_3Si(OCH_3)_3$ | 23.2 / 71 | 150 |
| (I) | 895 | ²5 |  | $Cl(CH_2)_3Si(OCH_3)_3$ / $CH_3Si(OCH_3)_3$ | 3.8 / 94.6 | 160 |
| (J) | 895 | ²5 |  | $CF_3CH_2CH_2Si(OCH_3)_3$ / $CH_3Si(OCH_3)_3$ | 3.6 / 94.6 | 100 |
| (K) | 180 | ¹1 |  | $HS(CH_2)_3Si(OCH_3)_3$ / $CH_3Si(OCH_3)_3$ | 0.77 / 9.5 | 100 |
| (L) | 180 | ¹1 |  | $HS(CH_2)_3Si(OCH_3)_3$ / $CH_3Si(OCH_3)_3$ | 1.55 / 9 | 100 |
| (M) | 180 | ¹1 |  | $HS(CH_2)_3Si(OCH_3)_3$ / $CH_3Si(OCH_3)_3$ | 3.09 / 8 | 130 |
| (N) | 180 | ¹1 |  | $HS(CH_2)_3Si(OCH_3)_3$ / $CH_3Si(OCH_3)_3$ | 4.6 / 7 | 180 |
| (O) | 715 | ²4 | 8 | $CH_3Si(OCH_3)_3$ | 80 | 200 |
| (P) | 90 | ²0.35 | 1 | $H_2NCH_2CH_2NH(CH_2)_3Si(OCH_3)_3$ | 7 | 10–1,000 |
| (Q) | 84 | ²0.75 | 1 | $HS(CH_2)_3Si(OCH_3)_3$ | 15.5 | 10–1,000 |
| (R) | 890 | ²5 | 10 | $C_4H_9Si(OCH_3)_3$ / $CH_3Si(OCH_3)_3$ | 4.1 / 96.4 | 310 |
| (S) | 890 | ²4.75 | 10 | $C_4H_9Si(OCH_3)_3$ / $CH_3Si(OCH_3)_3$ | 24.7 / 71 | 350 |
| (T) | 890 | ²5 | 10 | $H_2NCH_2CH_2NH(CH_2)_3Si(OCH_3)_3$ / $CH_3Si(OCH_3)_3$ | 3.6 / 96.4 | 350 |
| (U) | 890 | ²4.7 | 10 | $H_2NCH_2CH_2NH(CH_2)_3Si(OCH_3)_3$ / $CH_3Si(OCH_3)_3$ | 21.8 / 71 | 10–1,000 |
| (V) | 890 | ²5 | 10 | $HS(CH_2)_3Si(OCH_3)_3$ / $CH_3Si(OCH_3)_3$ | 3.86 / 96.4 | 270 |
| (W) | 890 | ²5 | 10 | $HS(CH_2)_3Si(OCH_3)_3$ / $CH_3Si(OCH_3)_3$ | 23.2 / 71 | 300 |
| (X) | 890 | ²5 | 10 | $Cl(CH_2)_3Si(OCH_3)_3$ / $CH_3Si(OCH_3)_3$ | 3.8 / 94.6 | 375 |
| (Y) | 890 | ²5 | 10 | $CF_3CH_2CH_2Si(OCH_3)_3$ / $CH_3Si(OCH_3)_3$ | 3.6 / 94.6 | 285 / 285 |
| (Z) | 890 | ²9.8 | 10 | $H_2NCH_2CH_2NH(CH_2)_3Si(OCH_3)_3$ / $CH_3Si(OCH_3)_3$ | 7 / 91 | 300 |
| (AA) | 895 | ²9.7 | 10 | $H_2NCH_2CH_2NH(CH_2)_3Si(OCH_3)_3$ / $CH_3Si(OCH_3)_3$ | 14 / 81 | 260 |

¹ Dodecylbenzene sulfonic acid.
² A 50% solution of lauryltrimethylammonium chloride in a 50–50 mixture of isopropanol and water.

EXAMPLE 17

When the following surfactants or mixtures thereof are employed in the above processes set forth in the preceding examples, equivalent results are obtained.

(A) Lauryl hydrogen sulfate
(B) Cetyl hydrogen sulfate
(C) Tridecyl hydrogen sulfate
(D) Lauryl hydrogen sulfate-sodium lauryl hydrogen sulfate
(E) Tridecyl hydrogen sulfate-sodium tridecyl hydrogen sulfate
(F) Octylbenzene sulfonic acid
(G) Tridecylbenzene sulfonic acid
(H) Lauryltrimethyl ammonium chloride
(I) Dilauryldimethyl ammonium chloride
(J) Cocotrimethyl ammonium chloride
(K) Dicocodimethyl ammonium chloride
(L) Cetylbenzyldimethyl ammonium chloride
(M) Lauryloxybenzyldimethyl ammonium chloride
(N) Laurylbenzyldimethyl ammonium bromide
(O) Stearyldimethylbenzyl ammonium bromide
(P) Lauryltrimethyl ammonium hydroxide
(Q) Laurylbenzyldimethyl ammonium hydroxide
(R) $(CH_3)_3SiC_{12}H_{24}SO_3H$
(S) $(C_2H_5)_3SiC_{14}H_{28}SO_3H$ (T) 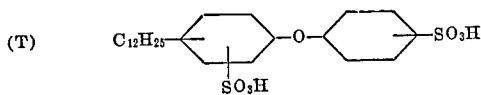

That which is claimed is:

1. A colloidal suspension of a silsesquioxane having the unit formula $RSiO_{3/2}$, wherein R is a monovalent radical selected from the group consisting of hydrocarbon and substituted hydrocarbon radicals containing 1 to 7 carbon atoms, in a water-surfactant mixture, said surfactant being selected from the group consisting of aliphatically substituted benzene sulfonic acids containing at least 6 carbon atoms in the aliphatic substituents, aliphatically substituted naphthalene sulfonic acids containing at least 4 carbon atoms in the aliphatic substituents, aliphatic sulfonic acids containing at least 6 carbon atoms in the aliphaitc substituent, silylalkyl sulfonic acids containing at least 6 carbon atoms in the alkyl substituent, aliphatically substituted diphenylether sulfonic acids containing at least 6 carbon atoms in the aliphatic substituents, alkyl hydrogen sulfates containing at least 6 carbon atoms in the alkyl substituents, quaternary ammonium halides and quaternary ammonium hydroxides, said silsesquioxane having an average particle size in the range of 10 to 1000 A.

2. The colloidal suspension of claim 1 wherein the surfactant is an anionic surfactant.

3. The colloidal suspension of claim 2 wherein R is a hydrocarbon radical and the silsesquioxane has an average particle size in the range of 10 to 500 A.

4. The colloidal suspension of claim 3 wherein R is selected from the group consisting of the methyl and phenyl radicals, and the surfactant is a compound of the formula $R'C_6H_4SO_3H$ wherein R' is a monovalent aliphatic hydrocarbon radical containing at least 6 carbon atoms.

5. The colloidal suspension of claim 4 wherein R' averages 12 carbon atoms.

6. The colloidal suspension of claim 2 wherein R is a substituted hydrocarbon radical and the silsesquioxane has an average particle size in the range of 10 to 500 A.

7. The colloidal suspension of claim 6 wherein R is selected from the group consisting of the 3,3,3-trifluoropropyl, $HS(CH_2)_3$— and $H_2NCH_2CH_2NH(CH_2)_3$— radicals.

8. The colloidal suspension of claim 1 wherein the surfactant is a cationic surfactant.

9. The colloidal suspension of claim 8 wherein R is a hydrocarbon radical and the silsesquioxane has an average particle size in the range of 10 to 500 A.

10. The colloidal suspension of claim 9 wherein R is selected from the group consisting of the methyl and phenyl radicals, and the surfactant is selected from the group consisting of quaternary ammonium halides and hydroxides.

11. The colloidal suspension of claim 8 wherein R is a substituted hydrocarbon radical and the silsesquioxane has an average particle size in the range of 10 to 500 A.

12. The colloidal suspension of claim 11 wherein R is selected from the group consisting of the 3,3,3-trifluoropropyl, $HS(CH_2)_3$— and $H_2NCH_2CH_2NH(CH_2)_3$— radicals.

13. The colloidal suspension of claim 1 wherein the silsesquioxane is a copolymer.

14. The colloidal suspension of claim 13 wherein some of the R radicals are hydrocarbon radicals and some of the R radicals are substituted hydrocarbon radicals.

15. The colloidal suspension of claim 14 wherein some of the R radicals are selected from the group consisting of the methyl and phenyl radicals, and some of the R radicals are selected from the group consisting of 3,3,3-trifluoropropyl, $HS(CH_2)_3$— and $$H_2NCH_2CH_2NH(CH_2)_3—$$

radicals.

16. The colloidal suspension of claim 14 wherein the surfactant is a cationic surfactant.

17. A process for making a colloidal suspension of a silsesquioxane in a water-surfactant mixture as defined in claim 1, which process comprises adding a silane having the formula $RSi(OR'')_3$, wherein R is as defined in claim 1 and R'' is a member selected from the groups consisting of the hydrogen atom, alkyl groups containing 1 to 4 carbon atoms, the

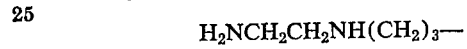

—$CH_2CH_2OH$, —$CH_2CH_2OCH_3$ and —$CH_2CH_3OC_2H_5$ groups, to a water-surfactant mixture, with agitation under acidic or basic conditions, the amount of silane added being less than about 10 percent by weight of the combined weights of the silane, water and surfactant.

18. The process of claim 17 wherein the surfactant is an anionic surfactant.

19. The process of claim 18 wherein R is a hydrocarbon radical and the silsesquioxane has an average particle size in the range of 10 to 500 A.

20. The process of claim 19 wherein R is selected from the group consisting of the methyl and phenyl radicals, and the surfactant is a compound of the formula $R'C_6H_4SO_3H$ wherein R' is a monovalent aliphatic hydrocarbon radical containing at least 6 carbon atoms.

21. The process of claim 20 wherein R' averages 12 carbon atoms.

22. The process of claim 18 wherein R is a substituted hydrocarbon radical and the silsesquioxane has an average particle size in the range of 10 to 500 A.

23. The process of claim 22 wherein R is selected from the group consisting of the 3,3,3-trifluoropropyl, $HS(CH_2)_3$— and $H_2NCH_2CH_2NH(CH_2)_3$— radicals.

24. The process of claim 17 wherein the surfactant is a cationic surfactant.

25. The process of claim 24 wherein R is a hydrocarbon radical and the silsesquioxane has an average particle size in the range of 10 to 500 A.

26. The process of claim 25 wherein R is selected from the group consisting of the methyl and phenyl radicals, and the surfactant is selected from the group consisting of quaternary ammonium halides and hydroxides.

27. The process of claim 24 wherein R is a substituted hydrocarbon radical and the silsesquioxane has an average particle size in the range of 10 to 500 A.

28. The process of claim 27 wherein R is selected from the group consisting of the 3,3,3-trifluoropropyl, HS(CH$_2$)$_3$— and H$_2$NCH$_2$CH$_2$NH(CH$_2$)$_3$— radicals.

29. The process of claim 17 wherein the silsesquioxane is a copolymer.

30. The process of claim 29 wherein some of the R radicals are hydrocarbon radicals and some of the R radicals are substituted hydrocarbon radicals.

31. The process of claim 30 wherein some of the R radicals are selected from the group consisting of the methyl and phenyl radicals, and some of the R radicals are selected from the group consisting of the 3,3,3-trifluoropropyl, HS(CH$_2$)$_3$— and H$_2$NCH$_2$CH$_2$NH(CH$_2$)$_3$— radicals.

32. The process of claim 30 wherein the surfactant is a cationic surfactant.

33. A process for making a colloidal suspension of a silsesquioxane in a water-surfactant mixture as defined in claim 1, which process comprises adding up to 50 percent by weight, based on the combined weights of the silane, water and surfactant, of a silane having the formula RSi(OR'')$_3$, wherein R is as defined in claim 1 and R'' is a member selected from the groups consisting of the hydrogen atom, alkyl groups containing 1 to 4 carbon atoms, the $$-\overset{O}{\underset{}{C}}CH_3, -\overset{O}{\underset{}{C}}C_2H_5$$

—CH$_2$CH$_2$OH, —CH$_2$CH$_2$OCH$_3$ and —CH$_2$CH$_2$OC$_2$H$_5$ groups, to a water-surfactant mixture, with agitation, under acidic or basic conditions, the rate of addition being less than ten mols of silane per liter per hour.

34. The process of claim 33 wherein the surfactant is an anionic surfactant.

35. The process of claim 34 wherein R is a hydrocarbon radical and the silsesquioxane has an average particle size in the range of 10 to 500 A.

36. The process of claim 35 wherein R is selected from the group consisting of the methyl and phenyl radicals, and the surfactant is a compound of the formula R'C$_6$H$_4$SO$_3$H wherein R' is a monovalent aliphatic hydrocarbon radical containing at least 6 carbon atoms.

37. The process of claim 36 wherein R' averages 12 carbon atoms.

38. The process of claim 34 wherein R is a substituted hydrocarbon radical and the silsesquioxane has an average particle size in the range of 10 to 500 A.

39. The process of claim 38 wherein R is selected from the group consisting of the 3,3,3-trifluoropropyl, HS(CH$_2$)$_3$— and H$_2$NCH$_2$CH$_2$NH(CH$_2$)$_3$— radicals.

40. The process of claim 33 wherein the surfactant is a cationic surfactant.

41. The process of claim 40 wherein R is a hydrocarbon radical and the silsesquioxane has an average particle size in the range of 10 to 500 A.

42. The process of claim 41 wherein R is selected from the group consisting of the methyl and phenyl radicals, and the surfactant is selected from the group consisting of quaternary ammonium halides and hydroxides.

43. The process of claim 40 wherein R is a substituted hydrocarbon radical and the silsesquioxane has an average particle size in the range of 10 to 500 A.

44. The process of claim 43 wherein R is selected from the group consisting of the 3,3,3-trifluoropropyl, HS(CH$_2$)$_3$— and H$_2$NCH$_2$CH$_2$NH(CH$_2$)$_3$— radicals.

45. The process of claim 33 wherein the silsesquioxane is a copolymer.

46. The process of claim 45 wherein some of the R radicals are hydrocarbon radicals and some of the R radicals are substituted hydrocarbon radicals.

47. The process of claim 46 wherein some of the R radicals are selected from the group consisting of the methyl and phenyl radicals, and some of the R radicals are selected from the group consisting of the 3,3,3-trifluoropropyl, HS(CH$_2$)$_3$— and H$_2$NCH$_2$CH$_2$NH(CH$_2$)$_3$— radicals.

48. The process of claim 46 wherein the surfactant is a cationic surfactant.

References Cited

UNITED STATES PATENTS

| | | |
|---|---|---|
| 2,840,087 | 6/1958 | Hersh. |
| 2,891,920 | 6/1959 | Hyde et al. |
| 3,208,911 | 9/1965 | Oppliger. |
| 3,228,903 | 1/1966 | Dennis. |
| 3,294,725 | 12/1966 | Findlay et al. |
| 3,360,491 | 12/1967 | Axon. |

MURRAY TILLMAN, *Primary Examiner.*

J. C. BLEUTGE, *Assistant Examiner.*

U.S. Cl. X.R.

117—141, 161; 260—46.5, 29.6, 825